United States Patent
Bacher

[19]

[11] Patent Number: 6,016,897
[45] Date of Patent: Jan. 25, 2000

[54] CLUTCH MECHANISM FOR FRICTION CLUTCH WITH LOW CLUTCHING FORCE

[75] Inventor: Michel Bacher, Andilly, France

[73] Assignee: Valeo, Paris, France

[21] Appl. No.: 09/066,363

[22] PCT Filed: Sep. 6, 1998

[86] PCT No.: PCT/FR97/01579

§ 371 Date: May 6, 1998

§ 102(e) Date: May 6, 1998

[87] PCT Pub. No.: WO98/10202

PCT Pub. Date: Mar. 12, 1998

[30] Foreign Application Priority Data

Sep. 6, 1996 [FR] France .................................. 96 11009

[51] Int. Cl.[7] .................................................. F16D 13/50
[52] U.S. Cl. ..................................... 192/70.27; 192/89.23; 192/109 A
[58] Field of Search ................................ 192/70.27, 89.23, 192/109 A, 66.31

[56] References Cited

U.S. PATENT DOCUMENTS

| 4,236,620 | 12/1980 | Beccaris | 192/70.27 X |
| 5,400,887 | 3/1995 | Mizukami et al. | 192/70.27 X |
| 5,452,783 | 9/1995 | Thirion de Briel et al. | |
| 5,579,881 | 12/1996 | Weidinger | 192/70.27 X |
| 5,632,365 | 5/1997 | Maucher | 192/109 A X |
| 5,794,753 | 8/1998 | Kemper | 192/70.27 X |
| 5,862,901 | 1/1999 | Weiss et al. | 192/70.27 X |

FOREIGN PATENT DOCUMENTS

| 0779446 | 6/1997 | European Pat. Off. . |
| 0228310 | 7/1997 | European Pat. Off. . |
| 1392569 | 2/1965 | France . |
| 2721669 | 12/1995 | France . |
| 4311286 | 10/1993 | Germany . |
| 4326501 | 2/1994 | Germany . |
| 4407260 | 9/1995 | Germany . |
| 9719275 | 5/1997 | WIPO . |

*Primary Examiner*—Rodney H. Bonck
*Attorney, Agent, or Firm*—Liniak, Berenato, Longacre & White

[57] ABSTRACT

The clutch mechanism comprises a cover plate (8) with a base (80), a resilient device (9) for coupling the pressure plate (3) in rotation with the cover plate (8), and, interposed between the dorsal surface of the pressure plate (3) and the base (80) of the cover plate (8), firstly a declutching member (7), and secondly two Belleville rings (4, 6) which are mounted in series between the dorsal surface (36) of the pressure plate (3) and the declutching member (7), which is pivoted at its outer periphery on a primary abutment (71) carried by the base (80) of the cover plate (8) radially outside the manoeuvring abutment (73), which is itself located radially outside a secondary abutment carried by the base (80) of the cover plate (8), for contact with the declutching member (7) and so as to define a reference position for the latter.

16 Claims, 3 Drawing Sheets

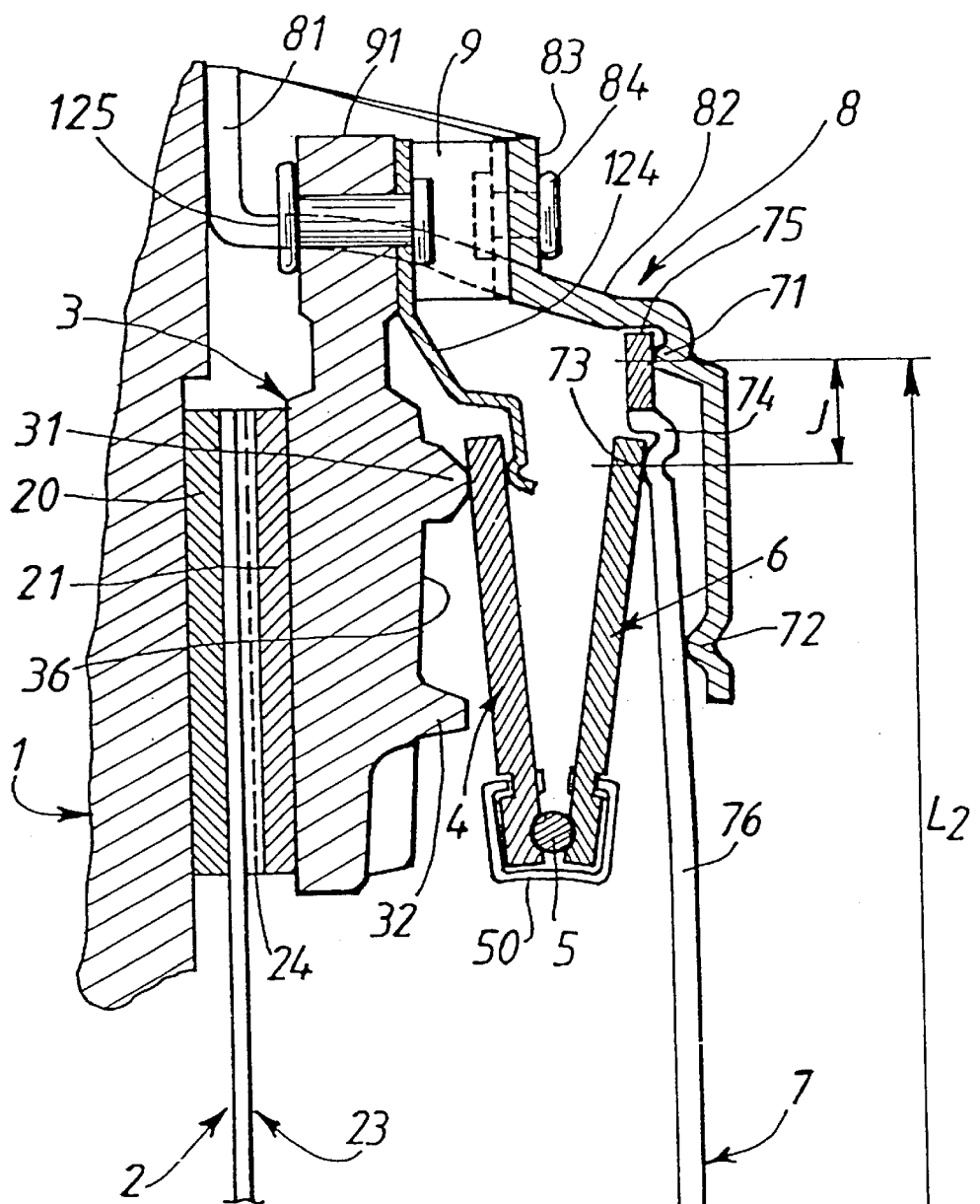
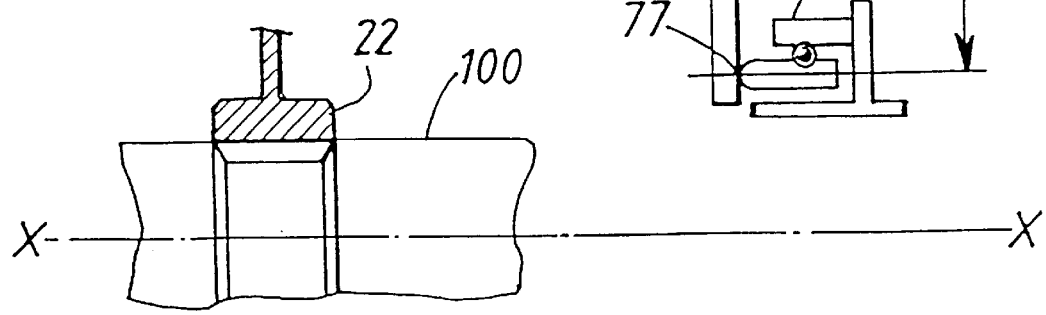
FIG.1

CLUTCH MECHANISM FOR FRICTION CLUTCH WITH LOW CLUTCHING FORCE

BACKGROUND OF THE INVENTION

1. Field of the Invention

The present invention relates to friction clutches with a low declutching force, especially for motor vehicles, and relates more particularly to the clutch mechanism which is included in such a clutch.

2. Description of the Related Art

As is known in a conventional clutch, a diaphragm interposed between a driving shaft and a driven shaft bears on the base of a cover plate, which is fixed to a rotary driving flywheel, so as to displace a pressure plate towards the said flywheel, which constitutes a reaction plate, in order that the friction liners of a clutch friction wheel shall be gripped between the pressure plate and reaction plate.

The driving flywheel is fixed to a first shaft, for example a driving shaft, while the clutch friction wheel has at its inner periphery a hub for mounting it in rotation on a second shaft such as a driven shaft.

The clutch is accordingly normally engaged with torque transmission between the driving and driven shafts.

In order to disengage (declutch) the clutch, it is necessary, with the aid of a clutch release bearing, to exert an annular thrust, in the case of a clutch of the push-to-release type, on the inner ends of the fingers of the diaphragm so as to cause the said diaphragm to pivot and overcome the force exerted by the diaphragm on the axially movable pressure plate, whereby to release the friction liners.

The torque is then no longer transmitted from the driving shaft to the driven shaft, because the friction liners are no longer gripped between the pressure plate and the reaction plate which are fixed to the cover plate in rotation.

Typically, the cover plate, the pressure plate and the diaphragm constitute a unitary assembly, referred to as a clutch mechanism, which can be fitted through its cover plate on the flywheel, with elastic tongues coupling the pressure plate to the cover plate for rotation with axial mobility.

As is known, the diaphragm has a central hole and includes an outer peripheral portion in the form of a Belleville ring which is extended internally by a central portion divided into radial fingers by slots. The diaphragm bears, through its Belleville ring portion, on the cover plate and on the pressure plate. Thus, the declutching means for the clutch, which enables the action of the resilient clutch engaging means to be counteracted at will, consists of the fingers of the diaphragm, on the inner ends of which the clutch release bearing acts, while the Belleville ring of the diaphragm constitutes axially acting resilient clutch engaging means for causing the friction liners to be gripped between the pressure plate and the reaction plate, and therefore for axially urging the pressure plate in a direction away from the base of the cover plate.

In the free state, the diaphragm is frusto-conical in form. Once it has been mounted in the clutch, its Belleville ring is mounted under prestress, and is flattened to a greater or lesser extent. During operation of the clutch (i.e. disengagement of the clutch), the cone angle of its Belleville ring is modified.

As is known, the characteristic curve of this diaphragm (with force exerted plotted against deflection), for example taken at the level of the inner ends of the fingers of the diaphragm, is determined by the dimensions of its Belleville ring and by the ratio between the depth of the frustum of the cone of the Belleville ring in the free state and the thickness of the diaphragm.

This characteristic curve passes through a maximum.

Thus, the force to be exerted on the inner ends of the fingers of the diaphragm increases to a maximum, diminishes gradually down to a minimum, and then rises again.

The difference between the maximum and the minimum may be large. For more detail as to this characteristic curve, reference should be made for example to the documents FR-A-1 392 569 or WO97/19275, and also to FIGS. 4 and 5 which show respectively the depth H of the frustum of the cone of a Belleville ring and the said curve, in which the load it exerts is expressed on the ordinate, and its deflection on the abscissa.

In the document FR-A-1 392 569, an elastic progressive engagement device was provided so as to avoid passing through the above mentioned maximum during the declutching operation. This device is mounted in series with the Belleville ring of the diaphragm, and exerts an elastic force which is significantly smaller than that of the Belleville ring. The device has a course of travel which is limited between a position of prestress in which its force is a maximum, and a stressed position in which its force is a minimum.

With this arrangement, a generally increasing declutching force is obtained at the clutch release bearing.

During the declutching operation, it is not possible to obtain as great an assisting force as desired, because the progressive engagement device reduces the load exerted by the diaphragm on the pressure plate when the clutch is engaged.

The intervention of an auxiliary spring in parallel with the diaphragm may accordingly be considered.

In that case, the auxiliary spring, for example in the form of a Belleville ring, may bear on the cover plate and on the inner ends of the fingers of the diaphragm.

When the clutch is in its engaged position, it can therefore exert a minimum force, and then, as its conicity varies, exert an assisting force during the declutching operation. It is then necessary that this assisting force shall be at a minimum, in the engaged condition of the clutch, over the whole working life of the clutch.

The ideal for this type of embodiment is to make use of a regulating device or so-called wear compensator, which maintains the diaphragm always in generally the same position regardless of the wear in the friction liners of the clutch and/or the friction surfaces of the pressure and reaction plates, in order that the auxiliary spring shall, under all circumstances throughout the working life of the clutch, exert a very low force when the clutch is in its engaged condition. To obtain an assisting force is therefore not as simple as is desirable.

An object of the present invention is to overcome these drawbacks, and accordingly to provide, in a simple and inexpensive way, a friction clutch with a low declutching force which makes use of springs acting in series, but without, at any time in the working life of the clutch, diminishing in particular the gripping force on the friction liners when the clutch is engaged.

SUMMARY OF THE INVENTION

According to the invention, a clutch mechanism of the above type is characterised in that the said resilient clutch engaging means comprise two Belleville rings mounted in series between the dorsal surface of the pressure plate and a manoeuvring abutment carried by the declutching member, namely a first Belleville ring adjacent to the pressure plate and a second Belleville ring adjacent to the declutching member, and in that the declutching member is pivoted at its outer periphery on a primary abutment carried by the base of the cover plate radially outwardly of the maneuvering abutment, which is itself located radially outwardly of a secondary abutment carried by the base of the cover plate for contact with the declutching member and for defining a reference position for the latter.

Thanks to the invention and the secondary abutment, when the clutch is engaged the declutching member is always in the same position without there being any need for a wear compensator as mentioned above.

The reference position is favourable to maneuver of the clutch using a clutch release bearing which is controlled by a hydraulic or electromechanical actuator.

The declutching force for disengaging the clutch using the clutch release bearing is small.

This is due in particular to the disposition of the maneuver and primary abutments.

In this connection, for example, the distance between the maneuvering abutment and the primary abutment may be ten times smaller than the distance between the primary abutment and the zone of engagement with the clutch release bearing. Large lever arms and high demultiplication are thus obtained, the force to be exerted by the clutch release bearing in order to disengage the clutch being for example ten times smaller than the clutch engaging force exerted by the Belleville ring concerned on the maneuvering abutment in the condition in which the clutch is engaged.

It will be appreciated that, as in a clutch of the pull-to-release type, the primary abutment for tilting deflection of the declutching member is located radially inwardly of the abutment offered by the pressure plate to the resilient clutch engaging means.

The cover plate thus undergoes less deformation than does that in a conventional clutch of the push-to-release type, in which the diaphragm is mounted for pivoting, for example with the aid of short posts, on the base of the cover plate in the region of the inner periphery of the said base. The cover plate accordingly has a simplified form because it does not have any posts.

Friction is also reduced because of the absence of the posts. Thanks to the invention, wear in the friction liners can be taken up.

The Belleville rings may be conventional Belleville rings, or Belleville rings having fingers at their outer or inner periphery, according to the characteristics required for each application.

According to one feature of the invention, an equilibrium created by the Belleville rings mounted in series is destroyed with the aid of the declutching member. In this connection, the Belleville rings are so dimensioned as to be in equilibrium in the condition in which the clutch is engaged. With all these arrangements an increasing declutching force is obtained at the clutch release bearing, as in the document FR-A-1 392 569, while having a reference position for the declutching member.

Thanks to the invention, the advantages of the above mentioned previous solutions are retained without the disadvantages.

The annular declutching member preferably consists of a false diaphragm, with a shallow annular peripheral portion which is extended by a very long main portion divided into radial fingers.

The load exerted by the annular portion is very small, or even nil as compared with the load exerted by the Belleville rings. For this purpose, the annular portion can be provided with blind slots which are open at its outer periphery.

The load exerted by the declutching member on the Belleville rings is therefore negligible. The problems connected with an auxiliary spring for relieving the resilient clutch engaging means are therefore not all present.

If necessary, this peripheral ring can be given some degree of elasticity, in order for example to improve comfort at the clutch pedal which controls the displacement of the clutch release bearing, and to ensure return of the clutch release bearing under all circumstances.

Due to the configuration of the declutching member, the maneuvering abutment can be press-formed, because the problems of mechanical stresses that occur in the diaphragm, in the region of the inner periphery of its Belleville ring in the junction zone with the fingers, are no longer present. This abutment may be joined through a further abutment, directed axially in the opposite direction from the maneuvering abutment.

By virtue of this additional press-formed element, it is thus possible to retain radially, or even to centre, the Belleville ring bearing on the declutching member.

Preferably, the primary abutment is offset axially towards the pressure plate with respect to the secondary abutment, for the purpose especially of reducing axial size and giving a good reference position. Thus, the annular peripheral portion of the declutching member is offset axially towards the pressure plate, with respect to its main portion.

The Belleville rings, inclined in opposite senses, are preferably of the positive and negative type.

The positive Belleville ring, in one embodiment, bears through its outer periphery on the maneuvering abutment, and exerts a load which increases as the depth of the frustum of its cone diminishes.

The negative Belleville ring bears at its outer periphery on the reaction plate, and exerts a load which diminishes as the depth of the frustum of its cone diminishes.

The structures can of course be reversed; the Belleville rings may converge towards each other at their outer periphery.

The positive Belleville ring has a dominant action as compared with the negative Belleville ring, and during the declutching operation it tends to open up and to close up the negative Belleville ring. The Belleville rings may exert similar loads.

For example the thickness of the positive Belleville ring is greater than that of the negative Belleville ring.

Thus, during the declutching operation, the declutching member is displaced away from its secondary abutment, so as, through its maneuvering abutment, to actuate the positive Belleville ring, which, because of its higher stiffness, tends to squeeze the negative ring.

For a given common displacement, the load exerted by the negative Belleville ring decreases less rapidly than that exerted by the positive Belleville ring, so that a new equilibrium is set up, given that the positive Belleville ring then has a cone frustum depth that increases, while that of the negative ring diminishes. The positive Belleville ring opens up by an amount greater than the amount by which the negative Belleville ring closes, so that the total depth of the Belleville rings is decreased.

In the direction of re-engagement of the clutch, the opposite occurs, with the load exerted by the negative Belleville ring increasing less rapidly than that of the negative Belleville ring for a given displacement.

Thus, the displacement of the pressure plate, and the load exerted on the latter, can be modulated during engagement and disengagement of the clutch.

In this way, the load exerted by the latter can be controlled at every instant.

Accordingly, the clutch release bearing can be controlled manually or by an actuator of simple form, of the hydraulic or electromechanical type. For example, an actuator of the electromechanical type may include an electric motor driving a gear train, a toothed wheel and a worm enabling the clutch release bearing to be displaced axially. The actuator does not have any resilient means for applying an assisting force. It will be noted that the resilient tongues ensure final separation of the pressure plate from the clutch friction wheel.

In one embodiment, the positive Belleville ring develops, in terms of absolute values, a maximum force (see the summit of the curve in FIG. 5) which is greater than that developed by the negative Belleville ring. In another version, in order to reduce declutching travel and declutching time, the positive Belleville ring is made larger than the negative ring, while being in equilibrium in the position in which the clutch is engaged.

Means are provided for preventing eversion of the Belleville ring. Thus, in one embodiment, the pressure plate preferably has a dorsal abutment for limiting the inclination of the negative Belleville ring, so as to prevent the latter from everting before the end of the declutching operation, thus avoiding any re-engagement of the clutch.

Thus the negative Belleville ring is mounted under prestress when the clutch is disengaged, and the same is true for the positive Belleville ring.

Return hooks are carried by the pressure plate so that the negative Belleville ring will be in permanent contact with the pressure plate during the clutch re-engagement and disengagement operations.

The following description illustrates the invention with reference to the attached drawings.

BRIEF DESCRIPTION OF THE DRAWINGS

FIG. 1 is a half view in axial cross section of a clutch in accordance with the invention in the engaged state;

FIG. 6 is a diagrammatic half view similar to part of FIG. 1, for another embodiment.

DETAILED DESCRIPTION OF THE PREFERRED EMBODIMENT

Figure 2:
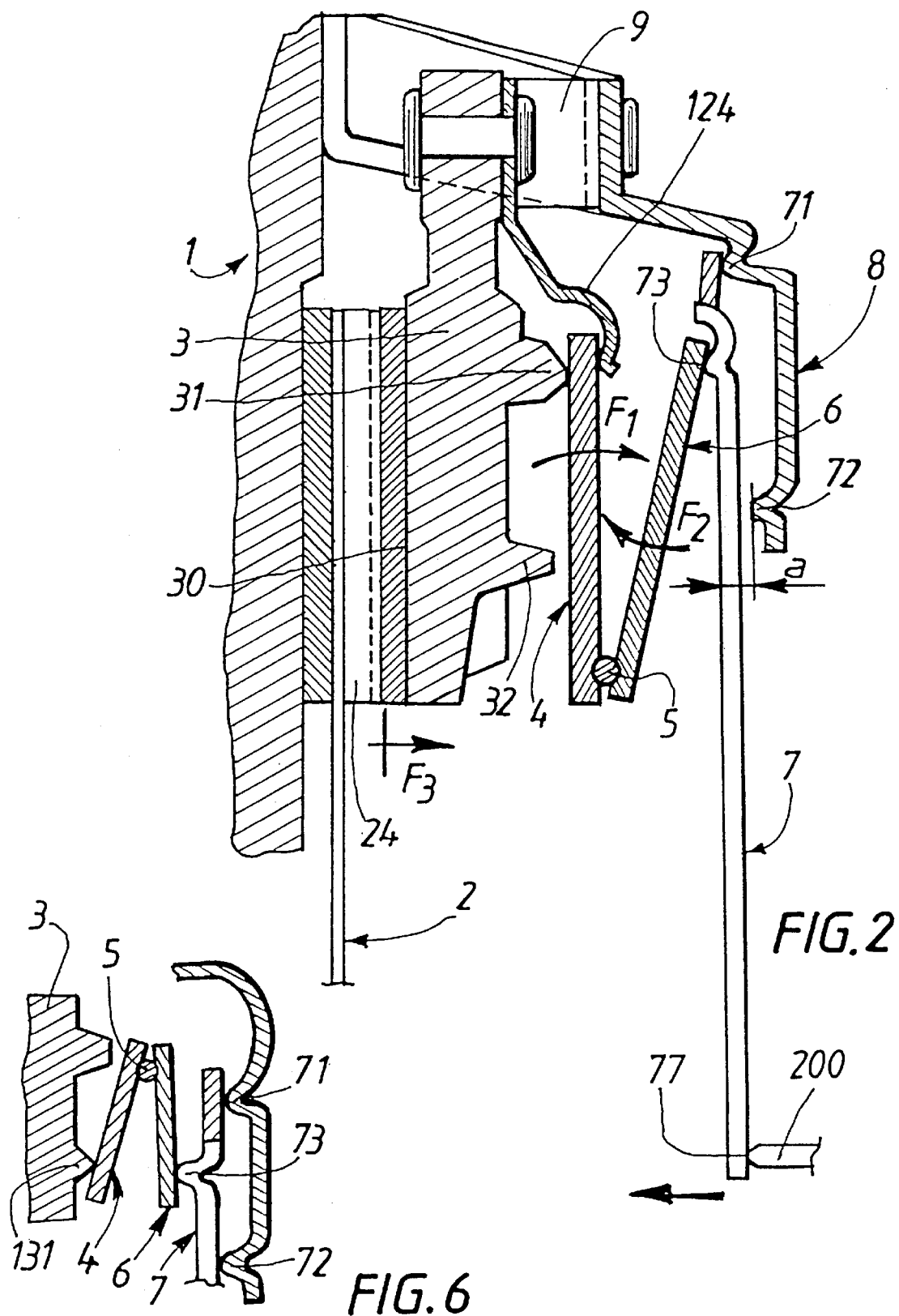
FIGS. 2 and 3 are views similar to FIG. 1, showing the clutch in the course of the declutching operation and in the disengaged state, respectively.

The clutch shown in the drawings, which is of the push-to-release type, comprises an assembly of annular components, namely, in axial succession, a flywheel 1 for driving in rotation and for fastening the clutch to a first shaft, such as a driving shaft, a clutch friction wheel 2 having at its outer periphery friction liners 20, 21 and at its inner periphery a hub 22 for coupling the clutch in rotation with a second shaft such as a driven shaft, a pressure plate 3, a first Belleville ring 4, a toroidal thrust ring 5, a second Belleville ring 6 inclined in the opposite direction from the first Belleville ring 4, an annular declutching member 7, a hollow cover plate 8 having a base 80 which is orientated generally transversely and which has a central through hole, with, at its outer periphery, fastening means 81 for fixing the cover plate 8 to the flywheel 1, which constitutes a reaction plate. The Belleville rings 4, 6 in this example exert similar loads.

The flywheel 1 has a dorsal friction surface 10 and is shown here only partially, given that, in the known way, it has central holes for fastening it to the driving shaft by means of screw fasteners. In this example the flywheel is made in one piece of casting material, as is the pressure plate 3, which has a front friction surface 30 facing towards the friction surface 10 of the flywheel 1.

The flywheel 1 and the pressure plate 3 in this example are in the form of castings or made in any other material suitable for working in dry friction.

The clutch friction wheel 2 also includes a support disc 23 for carrying the friction liners 20, 21, which may be of divided form. The liners 20, 21 lie on either side of the support disc 23, and are fixed to the latter for example by riveting. In this example the liners 20, 21 are secured by adhesive bonding or brazing to the metal support disc 23.

Elastic, axially acting, progressive engagement means 24 are interposed between the two liners 20, 21, for the progressive gripping of the latter between the flywheel 1 and the pressure plate 3. These means may take any appropriate form. In the present case, these means are formed by configuration of the support disc 23. This disc, by way of non-limiting example, may have a central portion for connecting it, either resiliently or otherwise, to the hub 22, and a peripheral portion which is divided into radial blades, for example of the tripod type. Each blade then has a central engagement zone which is adapted for the fastening of one of the friction liners 20, 21, together with two external peripheral engagement zones which are adapted to cooperate with the other one of the friction liners 21, 20.

The engagement zones are offset axially with respect to the central portion of the disc 23, the central engagement zone, which is larger, being joined to the said central portion through a tangential bend, while the peripheral engagement zones are joined to the said central engagement zone through oblique bends. For more detail, reference should be made to the document U.S. Pat. No. 5,452,783, which also shows an embodiment with friction liners divided into pads.

In this way, encrustation of the friction liners is minimised, so that the characteristic curve (of load exerted as a function of deflection) of the elastic progressive engagement means shows reduced variation over time.

As mentioned above, the disc 23 may be coupled elastically to the hub 22.

In another version, the disc 23 is coupled rigidly to the hub 22, the flywheel 1 being then divided so as to comprise two masses coupled elastically together by means of circumferentially or radially acting springs.

In a further version, the flywheel 1 may be in two parts, comprising a radial support plate which is fixed at its inner periphery to the driving shaft and at its outer periphery to a reaction plate having the friction surface 10. The cover plate 8 may then be assembled to the two-part flywheel 1 by means of axially orientated lugs which project from its cylindrical peripheral skirt 82. These lugs, which are in the form of tenons, are then engaged in mortices formed at the outer periphery of the reaction plate or that of the radial support plate. The free portion of the lugs, constituting the above mentioned fastening means 81 for the cover plate 8, may be fixed by seaming, bending over or welding to the radial plate or to the reaction plate, in the manner described for example in French patent application 95 12523 filed on Oct. 24, 1995 and published under the No. 2 741 917.

In this example, the cover plate 8 has the conventional form of a hollow dish, and the fastening means 81 consist of a radial flange of the cover plate 8 which extends radially in a direction away from the axial axis of symmetry of the clutch, the said flange 81 being formed with holes, not visible, for mounting fastening members such as screws or, in another version, rivets, securing the flange 81 to the flywheel 1.

In the context of application to a motor vehicle, the driving shaft in this example is the shaft of the vehicle engine, on the crankshaft of which the flywheel 1 is fixed, while the driven shaft consists of the input shaft of the gearbox, part of which is shown at 100 in FIG. 1.

It is of course possible to reverse the structure, so that the first shaft may be a driven shaft and the second shaft a driving shaft.

In the drawings, the pressure plate 3 is coupled in rotation to the cover plate 8 by means of resilient tongues 9 which enable the pressure plate 3 to be displaced axially with respect to the cover plate 8.

The pressure plate 3 is therefore fixed to the cover plate 8 and flywheel 1, for rotation therewith, while being able to be displaced axially with respect to these latter.

The tongues 9 in this example are orientated tangentially, and bias the pressure plate 3 towards the base 80 of the cover plate. These elastic tongues 9 therefore act axially and have a return function. In another version, the tongues may be inclined, or may be orientated radially, while retaining an axial action.

In the present case the external cylindrical skirt 82 of the cover plate 8, joining the base 80 to the radial fastening flange 81, is perforated locally so as to allow lugs 91, projecting radially from the pressure plate 3, to pass through it. The tangential tongues 9 are fixed at one of their ends to the lugs 91, and at their other end to a radial portion 83 of the cover plate (FIG. 1). These tongues 9 are spaced apart circumferentially at regular intervals in a known way, and the number of these tongues, like that of the lugs 91, depends on the application, given that for cruising vehicles there are generally three groups of tongues 9.

The fastening of the latter on the portions 83 and the lugs 91 is obtained by means of fastening members 84, typically rivets or in another version screws or bolts. In this example the rivet 84 associated with the lug 91 cannot be seen, because the latter is wide in the circumferential direction for the fastening of a return hook 124 which applies the first Belleville ring 4 to the pressure plate 3; fastening of the hooks 124, of which there is one to each lug 91, is obtained by means of rivets 125, or in a modification screws or bolts.

More precisely, the first ring 4 bears at its outer periphery on an annular boss 31, which is of divided form in this example and which is formed on the pressure plate 3 on its dorsal surface 36.

The boss 31 projects axially towards the base 80 of the cover plate 8, and is pointed, having a rounded apex for local contact with the outer periphery of the first Belleville ring 4, which is gripped between the boss 31 and the hooks 124, which in this example are of metal and resilient.

These hooks 124 have rounded ends so as to make point contact with the ring 4 in alignment with the boss 31. The said ring 4 is inclined towards the cover plate 8.

In accordance with one feature of the invention, the second Belleville ring bears, in this example at its outer periphery, on the declutching member 7. It is inclined towards the pressure plate 3 in the opposite direction from the ring 4.

For this purpose, the said member has an annular abutment 73. This abutment 73 constitutes a maneuvering abutment in the way described later herein.

In this example, the declutching member 7 is of metal, and the abutment 73 is press-formed, having a rounded form.

The two Belleville rings 4, 6 thus define a V-shape, being in contact at their inner periphery with the annular force transmitting ring 5 which is interposed between them.

The Belleville rings 4, 6 are of course so dimensioned that equilibrium will be obtained when the clutch is in its engaged position (FIG. 1).

The rings 4, 6 are preferably recessed, in this example by a forming process, locally so as to receive the ring 5. The outer face of the rings 4, 6 is grooved so as to retain a U-shaped pinch clip 50, the free ends of the branches of which are orientated axially. The pinch clip 50 has a base portion which lies radially inwardly of the rings 4, 6.

The pinch clip 50, which is of annular form in this example, is elastic so as to hold the Belleville rings elastically in contact with the ring 5, being in contact through its branches with the outer surfaces of the rings. The said pinch clip may be divided into individual clips.

The pinch clip opens or closes according to the inclination of the rings 4, 6.

The declutching member 7 is adapted to bear locally at its outer periphery on an annular primary abutment 71 which is press-formed at the outer periphery of the cover plate 8, which in this example is a metal pressing. The cover plate has an annular press-formed secondary abutment 72 in the region of the inner periphery of its base 80 having the central hole.

The declutching member 7 is arranged to make local contact on the primary abutment 71, which constitutes a pivoting fulcrum. The primary abutment 71 is offset axially towards the flange 81 and pressure plate 3, with respect to the secondary abutment 72.

Thus when the clutch is in its engaged condition, the declutching member bears on the secondary abutment 72.

In accordance with one feature, the manouvering abutment 73 of the declutching member is located radially between the abutments 71, 72. The abutments 71 to 73 may of course be replaced by annular toroidal rings, the cover plate 8 and the member 7 being recessed accordingly for this purpose.

In every case, the abutments 71, 72 and 73 are carried respectively by the base 80 of the cover plate and the declutching member.

It will be noted that the outer periphery 75 of the declutching member 76, which is of metal here, is offset axially with respect to the main portion 76 of the said member 7 so that, in combination with the offset of the primary abutment 71, it reduces axial size. This offset of the portion 75 is obtained by local press-forming, at 74, of the declutching member 7 towards the base 80 of the cover plate. The press-formed element 74 joins the peripheral portion 75 to the abutment 73 in such a way that the peripheral portion 75 is joined to the main portion through an annular portion which is generally in the form of an inverted S. It will be noted that the press-formed element 74 also enables the Belleville ring 6 to be retained radially and centred. The press-formed element 74 extends axially in the opposite direction from the abutment 73, and stiffens the zone that extends between the abutment 73 and the ring portion 75.

All of this is made possible because, in accordance with one feature of the invention, the declutching member 7 does not exert any significant axial elastic force (the load which it applies being small).

The declutching member 7 is arranged to counteract and overcome at will the elastic force applied by the Belleville rings 4, 6, with a view to releasing at will the friction liners 20, 21 and the clutch friction wheel 2 from between the pressure plate 3 and the reaction plate that consists of the flywheel 1, whereby to disengage the clutch.

The Belleville rings 4, 6 enable the said liners to be gripped between the plates 1, 3, and constitute axially acting clutch engaging means which bias the pressure plate 3 in a direction away from the generally transversely orientated base 80 of the cover plate 8. The base 80 is directed radially towards the axial axis of symmetry X—X of the clutch.

In the present case, the clutch is of the push-to-release type. It is therefore necessary to act in a thrust mode on the inner end of the main portion 76, having a central hole, of the declutching member, by means of a clutch release bearing 200 which in this example is carried by the casing of the gearbox.

Figure 3:
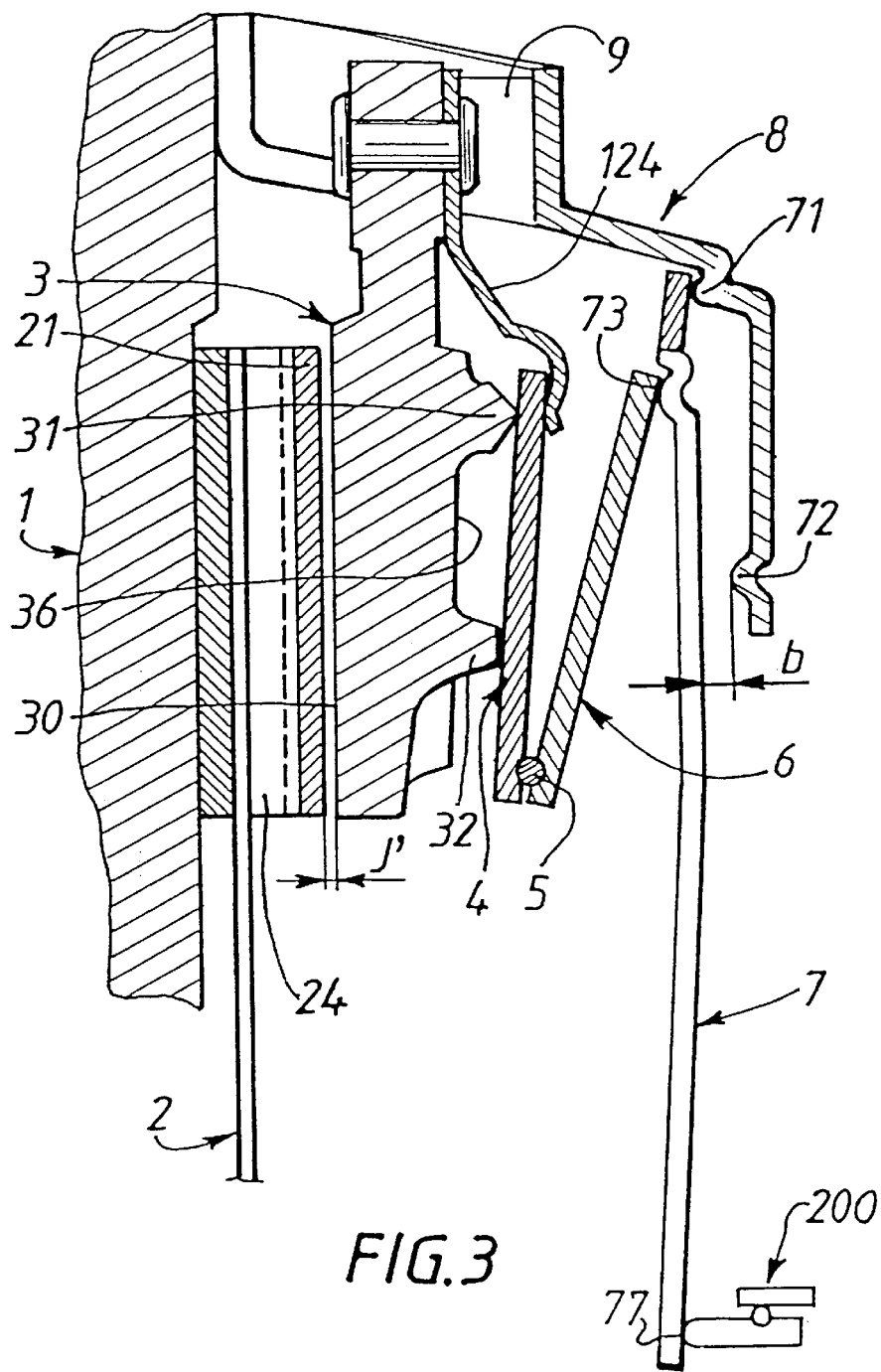

Thus, in FIG. 1, the clutch is in its engaged position (with the liners 20, 21 gripped between the plates 1, 3), while in FIG. 2 the clutch release bearing 200 has been displaced towards the left so as to disengage the clutch, the movement of the release bearing being continued to the position in FIG. 3, in which the clutch is fully disengaged (liners released).

In the engaged condition of the clutch, the declutching member is in contact with the secondary abutment 72 (zero clearance), while in the course of the declutching operation (i.e. passage from FIG. 1 to FIG. 2 and then to FIG. 3), the clearance between the member 7 and the abutment 72 increases, with the declutching member 7 pivoting about the primary abutment 71.

More precisely, in accordance with one feature of the invention, the second Belleville ring 6 is a so-called positive ring, that is to say that, as the height of the frustum of the cone (or total thickness) of the Belleville ring diminishes, the load applied by the ring increases.

The first Belleville ring 4 is a so-called negative ring, that is to say, as the height of the frustum of the cone (or total thickness) of the ring diminishes, the load applied by the ring diminishes.

Figure 4:
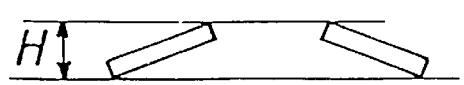
FIG. 4 is a view showing one Befleville ring with its frustum of a cone.
Figure 5:
FIG. 5 is a view showing the characteristic curve of a Belleville ring (with load exerted plotted against deflection)

More precisely, and with reference to the characteristic curve of a Belleville ring, the working zone of the positive ring occurs generally from zero to the maximum of the curve, while the working zone of the negative ring occurs generally beyond the above mentioned maximum, as described in the document WO97/19275 (especially in FIG. 4), to which reference can be made for more detail, in particular in order to see the variations in the conicity of the Belleville rings. The Belleville rings 4, 6 therefore work in a generally linear way, the minimum load exerted by the negative ring being close to zero.

In accordance with one feature, the positive Belleville ring has a dominant action with respect to the negative Belleville ring 4. It is adapted to deform the latter, that is to say to flatten it. The maximum load which it develops is for example greater in terms of absolute values than the maximum load developed by the negative Belleville ring. In this example, the stiffness of the positive ring 6 is higher (greater) than the stiffness of the negative ring 4 in absolute values.

The ring 5 transmits forces between the rings 4, 6.

The declutching member 7 has a main portion 76 in the form of fingers separated by slots, the portion 76 extending the peripheral portion 75.

These fingers are longer than the fingers of a conventional diaphragm. They may have central longitudinal ribs.

The peripheral portion 75 joins the fingers together, and consists of a simple ring which is preferably formed with blind radial slots open outwardly so that the said ring does not exert any load, or only exerts a very small load.

In this way, a large lever arm can be obtained and the load to be applied at 77 to disengage the clutch (i.e. the line of contact with the clutch release bearing) can be reduced.

In the engaged condition of the clutch, the two Belleville rings 4, 6, which are mounted in series in accordance with one feature of the invention, are in equilibrium, having regard also to the action exerted by the elastic progressive engagement means 24 and the return force applied by the tongues 9.

According to one feature, the length of the fingers of the main portion 76 is large as compared with the depth of the ring 75: for example the depth of the ring 75 and the abutments 73, 74 may be such that the distance between the primary abutment 71 and the maneuvering abutment 73 is one tenth of the distance between the primary abutment 71 and the point of engagement 77 with the clutch release bearing.

Let M be the load exerted by the Belleville rings on the abutment 73 of the declutching member 7, so that by suitable choice of L2 (i.e. the distance between the abutments 71 and 77) and J (i.e. the distance between the abutments 71 and 73), it is possible to obtain a lever arm ratio J/L2 of 1/10, such that the applied thrust needed in order to disengage the clutch is ten times less than the gripping force of the Belleville rings between the points 31 and 73.

With the clutch in its engaged condition, the position of the abutment 73 is fixed, because, according to a feature of the invention, the lever is in engagement on the primary abutment 71 and secondary abutment 72 of the cover plate. The secondary abutment 72 thus enables a reference position to be defined for the declutching member 7.

The ends of the fingers of the declutching member therefore always occupy the same position regardless of wear in the friction liners 20, 21 and/or in the friction surfaces 10, 30. There is therefore no need to provide a device to compensate for wear in the said liners and/or surfaces, so that this solution is inexpensive.

In this position, the progressive engagement means 24 undergo maximum squeezing. It will be noted that the portion 76 has a bend for reducing axial size.

In the event of wear occurring, the pressure plate 3 is displaced towards the flywheel 1, until a new equilibrium is obtained for the rings 4, 6.

In this connection, the distance between the boss 31 and the abutment 73, thus fixed, increases, so that the V which is defined by the Belleville rings 4, 6 opens up a little more. The load exerted by the first Belleville ring 4 on the ring 5 tends to increase, while the load exerted by the second Belleville ring 6 on the ring 5 tends to diminish; a new equilibrium is thus achieved.

During the declutching operation by exerting an axial thrust by means of the clutch release bearing 200 at 77 on the inner ends of the fingers of the portion 76, the member 7 separates from its secondary abutment 72 and a clearance has appeared (FIG. 2).

The abutment 73 tends to approach the boss 31, while the resilient progressive engagement means 24 relax and displace the pressure plate 3, in the direction of the arrow F3, towards the base 80 of the cover plate 8. The distance between the boss 31 and the abutment 73 tends to diminish, with the second Belleville ring 6 being displaced in the direction of the arrow F2 and the first Belleville ring 4 in the direction of the arrow F1 (see FIG. 2). The positive ring 6 opens up, while the negative ring 4 closes.

Because of the stiffnesses of the rings 4, 6 and the progressive engagement means 24, a new equilibrium is created with the load exerted by the Belleville rings on the pressure plate being reduced, and with the V defined by the Belleville rings 4, 6 closing up.

As the declutching operation proceeds, instantaneous equilibria are created, with the load exerted on the pressure plate 3 being modulated.

In this connection, for a given displacement in absolute value terms, and having regard to the higher stiffness of the ring 6, the load of the ring 4 decreases less rapidly than that of the ring 6, so that initially, the positive ring 6 squeezes the negative ring 4 until, by reaction of the negative ring 4, a new equilibrium is set up due to the fact that the load on the positive ring diminishes more rapidly.

The positive Belleville ring opens up to a lesser extent than the negative Belleville ring closes.

When the clutch release bearing 200 has completed its maximum travel (FIG. 3), the clearance between the secondary abutment 72 and the declutching member 7 increases and takes the value b. The first Belleville ring 4 closes up and the depth of the frustum of its cone diminishes, while the second Belleville ring opens up, with the depth of the frustum of its cone increasing.

The loads of the two rings 4, 6 diminish sharply, due to the fact that the first ring 4 is negative and the second ring positive.

These rings therefore being sharply unloaded, the tongues 9 then return the plate 3 towards the base 80 of the cover plate, given that the return force exerted by the tongues 9 is very much smaller than that of the resilient progressive engagement means 24 which are then in a relaxed condition. A clearance J' appears then between the pressure plate 3 and the liners 20, 21.

It will be noted that an annular abutment 32 is formed on the dorsal face 36 of the pressure plate 2, in this example by casting. This abutment 32, in combination with the hooks 124, prevents the first Belleville ring 4 from eversion, which could give rise to an increase in the force exerted on the pressure plate, upsetting the equilibrium and even causing re-engagement of the clutch.

Thus, the clutch mechanism is provided with means for preventing eversion of the negative Belleville ring. These means may take some other form. The first ring 4 is fitted under prestress.

For safety reasons, an abutment can of course be provided for limiting the travel of the declutching member 7, in such a way as to prevent the second ring 6 becoming reloaded due to the fact that the first ring 4 is in contact with the abutment 32.

Thus the member 7 may carry short posts passing through apertures formed in the base 80 of the cover plate 8. The heads of the short posts then come into contact with the face of the base 80 which faces away from the pressure plate 3.

During re-engagement of the clutch (i.e. passage from FIG. 3 to FIG. 2 and then to FIG. 1), the equilibrium of the system is changed in the other axial direction; the two Belleville rings together then find a new equilibrium when the pressure plate 3 comes into contact once again with the friction liner 21.

Thus the resilient means 24 are compressed until they regain the position of FIG. 1.

Thus, thanks to the invention, in the engaged position of the clutch, the declutching member 7 is always in the same position regardless of the amount of wear in the friction liners and/or in the friction surfaces.

Because of the hooks 124, the negative Belleville ring 4 is in permanent contact with the boss 31, so that the operations of engaging and disengaging the clutch are carried out in a certain and reliable way.

Because of the high lever arm, a low declutching force is obtained at the clutch release bearing 200.

As will have been understood, the ring 5 is a rounded means for transmitting force. In another version, this ring may be replaced by a rounded press-formed element formed on the inner periphery of one of the Belleville rings 4, 6.

This press-formed element has for example a form similar to that of the abutments 71 to 73. The force transmitting means can then take different forms.

The pressure plate 3 has a front friction face 30 for cooperation with the clutch friction wheel. The dorsal surface 36 of the pressure plate is so configured as to offer an abutment (the boss 31) to the negative Belleville ring 4 and to define an abutment 32 for limiting the inclination of the ring 4.

The said abutment 32, formed by casting, is located radially inwardly of the boss 31, and has a height which is smaller than the latter.

The resilient clutch engaging means (i.e. the Belleville rings 4, 6) and the declutching member 7 are interposed between the cover plate 8 and the pressure plate 3 so as to form, with the latter and in combination with the tongues 9 and the hooks 124, a unitary assembly which can be handled and transported and which is the so-called clutch mechanism.

It is this clutch mechanism that is fitted on the rotary driving flywheel 1.

It will be noted that in this example the cover plate surrounds the pressure plate, the Belleville rings 4, 6 and the declutching member 7.

In this example the primary abutment 71 is located as high as possible, in the region of the junction zone between the base 80 and the skirt 82 of the cover plate 8.

This abutment may of course be displaced radially inwards. The secondary abutment 72 may be defined directly by the inner periphery of the base 80.

In another version, the ring 75 may be g iven a small amount of elasticity so as to increase comfort at the control pedal for the clutch release bearing, and to exert a return action.

In the above description, the Belleville rings exert similar forces. The positive Belleville ring can of course be enlarged as compared with the negative Belleville ring so as to have a shorter declutching travel and more rapid declutching action, given that the Belleville rings are in equilibrium when the clutch is in its engaged condition.

The positive Belleville ring can be made stiffer, for example by increasing its thickness as compared with the negative Belleville ring. The cone angle of the Belleville rings can be varied, or any other means may be adopted in order that the positive Belleville ring will be dominant.

In another version, the Belleville rings 4 and 6 may include fingers at their inner or outer periphery. The structures may of course be reversed.

Thus (FIG. 6) the negative ring 4 is in contact at its inner periphery with a divided boss 131 of the pressure plate 3, while the positive ring 6 bears at its inner periphery on the maneuvering a butment 73 of the declutching member 7, the said rings being inclined in opposite directions.

Force transmitting means, i.e. the ring 5, are interposed between the outer peripheries of the Belleville rings.

Thus the force transmitting means are in all cases interposed between the adjacent peripheries of the Belleville rings.

Similarly, in all cases the first Belleville ring 4 is adjacent to the pressure plate 3, while the second Belleville ring is adjacent to the declutching member 7. In another version, the positive second Belleville ring 6 may be replaced by an axially acting resilient ring having the same characteristic curve, such as, for example, an axially corrugated resilient ring.

However, for simplicity, the resilient ring adjacent to the declutching member is referred to as the second Belleville ring.

On the other hand, the resilient ring which is adjacent to the pressure plate is a ring of the Belleville type, so as to obtain the required characteristic curve.

The cover plate 8 may of course have a less dished form. It may even be flat. In that case, in a known way, the flywheel 1 has an axially oriented annular skirt at its outer periphery.

I claim:

1. A clutch mechanism for a friction clutch, comprising a cover plate (8) with a transversely orientated base (80) and fastening means (81) for fastening the clutch mechanism on a rotary driving flywheel (1), a pressure plate (3) having a front friction surface (30) for cooperation with a clutch friction wheel (2), and a dorsal surface (36) facing the base (80) of the cover plate (8), resilient tongues (9) for coupling the pressure plate (3) in rotation to the cover plate (8) with axial mobility, and, interposed between the dorsal surface of the pressure plate (3) and the base (80) of the cover plate (8), firstly, axially acting resilient engaging means (4 to 6) biasing the pressure plate (3) axially away from the base (80) of the cover plate (8), and, secondly, an annular declutching member (7) for counteracting at will the action of the resilient clutch engaging means (4 to 6), wherein the resilient clutch engaging means (4, 6) comprise two Belleville rings (4, 6) mounted in series between the dorsal surface (36) of the pressure plate (3) and a maneuvering abutment (73) carried by the declutching member (7), namely a first Belleville ring (4) adjacent to the pressure plate (3) and a second Belleville ring (6) adjacent to the declutching member (7), and in that the declutching member (7) is pivoted at its outer periphery on a primary abutment (71) carried by the base (80) of the cover plate (8) radially outwardly of the maneuvering abutment (73), which is itself located radially outwardly of a secondary abutment (72) carried by the base (80) of the cover plate (8) for contact with the declutching member (7) and for defining a reference position for the latter.

2. A mechanism according to claim 1, wherein the first Belleville ring (4) is in contact at its outer periphery with the pressure plate (3), while the second Belleville ring (6) bears at its outer periphery on the maneuvering abutment (73), the rings (4, 6) being inclined in opposite directions.

3. A mechanism according to claim 1, wherein the first Belleville ring (4) is in contact at its inner periphery with the pressure plate (3), while the second Belleville ring (6) bears at its inner periphery on the maneuvering abutment (73), the rings (4, 6) being inclined in opposite directions.

4. A mechanism according to claim 1, wherein the first Belleville ring (4) is a so-called negative Belleville ring (4), exerting a load which diminishes as the depth of the frustum of its cone diminishes, and in that the second Belleville ring (6) is a so-called positive Belleville ring, exerting a load which increases as the depth of the frustum of its cone diminishes.

5. A mechanism according to claim 4, wherein the positive Belleville ring (6) is so chosen as to exert a dominant action as compared with the negative Belleville ring (4).

6. A mechanism according to claim 5, wherein the stiffness of the positive Belleville ring (6) is greater than the stiffness of the negative Belleville ring (4).

7. A mechanism according to claim 5, wherein, in terms of absolute values, the positive Belleville ring (6) develops a maximum load which is greater than that developed by the negative Belleville ring (4).

8. A mechanism according to claim 1, wherein the Belleville rings (4, 6) exert similar loads.

9. A mechanism according to claim 1, wherein force transmitting means (5) are interposed between adjacent peripheries of the Belleville rings.

10. A mechanism according to claim 9, wherein the force transmitting means (5) consist of a toroidal ring.

11. A mechanism according to claim 10, wherein the Belleville rings are held in contact with the force transmitting ring (5) by a resilient pinch clip (50), being of divided form and which engages with the external faces of the Belleville rings that face away from the force transmitting ring (5).

12. A mechanism according to claim 1, wherein the declutching member (7) includes an annular peripheral portion (75) extended by a main portion (76) which is divided into radial fingers by slots, and in that the maneuvering abutment (73) is press-formed and is joined to the inner periphery of the annular peripheral portion (75) of the declutching member (7) by a press-formed element (74) projecting axially in the opposite direction from the maneuvering abutment (73).

13. A mechanism according to claim 12, wherein the peripheral portion (75) of the declutching member (7) is offset axially with respect to its main portion.

14. A mechanism according to claim 1, wherein the primary abutment (71) is offset axially with respect to the secondary abutment (72).

15. A mechanism according to claim 1, wherein the pressure plate (3) has a dorsal boss (31) for engagement by the outer periphery of the Belleville ring (4) concerned, and an abutment (32) which is located radially inwardly of the boss so as to limit the inclination of the Belleville ring.

16. A mechanism according to claim 15, wherein the Belleville ring is subject to the action of elastic hooks (124) which are fixed to the pressure plate, and in that the outer periphery of the Belleville ring is gripped between the boss of the pressure plate and the hook.

* * * * *